United States Patent [19]

Valsamis et al.

[11] 4,411,532
[45] Oct. 25, 1983

[54] ROTARY PROCESSOR

[75] Inventors: Lefteris N. Valsamis, West Haven; Jan-Chin Yang, Huntington; Gary S. Donoian, West Haven, all of Conn.

[73] Assignee: USM Corporation, Farmington, Conn.

[21] Appl. No.: 336,607

[22] Filed: Jan. 4, 1982

[51] Int. Cl.³ ............................................... B01F 7/10
[52] U.S. Cl. ....................................... 366/99; 366/307; 366/315; 415/90; 415/102; 425/204; 425/224; 425/466
[58] Field of Search .............................. 366/69, 75–77, 366/96–99, 136, 137, 262–265, 292, 293, 302–307, 315, 336, 337, 340, 349; 415/90, 101, 102, 170 R; 264/85, 349, 176 C; 425/224, 204, 466, 209, 374; 72/60, 262, 270

[56] References Cited

U.S. PATENT DOCUMENTS

| | | | |
|---|---|---|---|
| 3,138,369 | 6/1964 | Bennett et al. | 366/136 |
| 3,308,510 | 3/1967 | Gabbrielli | 425/466 |
| 3,371,912 | 3/1968 | Samler et al. | 366/136 |
| 3,765,216 | 10/1973 | Green | 72/262 |
| 3,778,036 | 12/1973 | Collin | 425/209 |
| 4,041,745 | 8/1977 | Green et al. | 72/262 |
| 4,142,805 | 3/1979 | Tadmor | 366/97 |
| 4,194,841 | 3/1980 | Tadmor | 366/97 |
| 4,329,065 | 5/1982 | Hold et al. | 366/97 |

Primary Examiner—Philip R. Coe
Assistant Examiner—Timothy F. Simone
Attorney, Agent, or Firm—John P. Morley; Frances J. P. Craig

[57] ABSTRACT

A novel, improved rotary processor comprising a rotatable element carrying a plurality of processing channels and a stationary element having a coaxial closure surface operationally arranged with the channels to provide a plurality of enclosed processing passages. The plurality of passages provide interconnected processing stages including a first processing stage and a second processing stage having inboard and outboard sections separated by a third processing stage.

14 Claims, 14 Drawing Figures

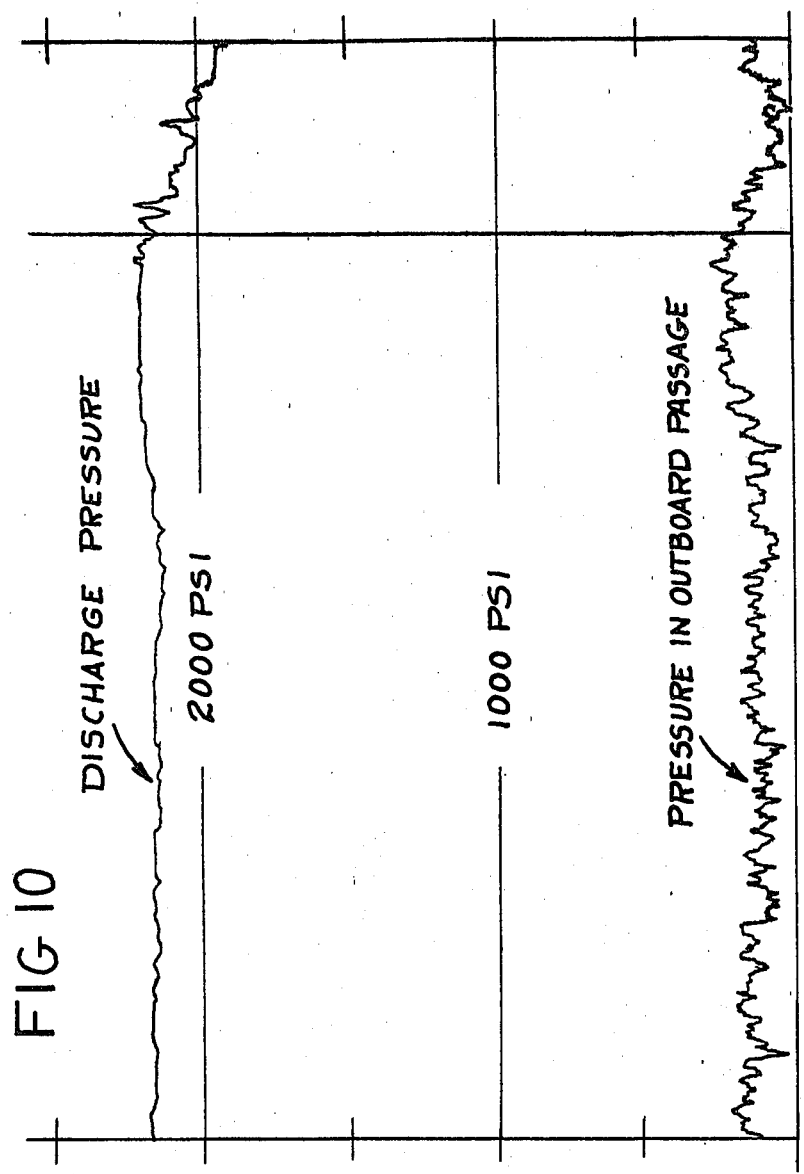

ROTARY PROCESSOR

BACKGROUND OF THE INVENTION

1. The Field of the Invention

This invention relates to processing apparatus. More precisely, this invention relates to multi-stage rotary processors particularly useful for processing plastic and polymeric materials.

2. Description of the Prior Art

Rotary processors are known to the art. Details relating to such processors are described in U.S. Pat. Nos. 4,142,805; 4,194,841, 4,207,004; 4,213,709; 4,227,816; 4,255,059; 4,289,319; 4,300,842; 4,329,065 and in commonly assigned, copending application Ser. No. 971,332 filed Dec. 20, 1978, now abandoned. All of the above patents and applications are incorporated here by reference.

Multi-stage rotary processors are also known to the art. U.S. Pat. No. 4,227,816 specifically relates to a rotary processor having two stages in three sections. Rotary processors of U.S. Pat. No. 4,227,816 comprise a rotatable element or rotor carrying a plurality of processing channels and a stationary element providing a coaxial closure surface cooperatively arranged with the channels to provide enclosed processing passages. Also associated with the stationary element are inlets, outlets and blocking members for each passage and material transfer passages or grooves formed in the closure surface of the stationary element and arranged to transfer material from a passage (or passages) of one stage to a passage (or passages) of another stage. As disclosed in U.S. Pat. No. 4,227,816, one processing stage involves two primary or supply sections. Each primary or supply section of the first stage is arranged at each end of the rotor and are separated from each other by a second processing stage adapted to receive material from each section of the first stage.

U.S. Pat. No. 4,213,709 also relates to a multi-stage rotary processor which provides two processing stages including a primary processing passage interconnected to a further processing passage. The preferred processor involves two primary processing passages, each arranged at each end of the rotor with the primary processing passages separated by two further processing passages adapted to receive material from the primary processing passages. In the processors described in U.S. Pat. Nos. 4,213,709 and 4,227,816, the passages adapted to receive material from passages of another stage are of a selected geometry relative to the geometry of the passages from which the material is received. Essentially, the geometry is selected to provide the material receiving passage with the capability to process and discharge material at a volume rate which is less than the volume rate at which material is received by the passage. Such geometries assure complete filling of the receiving passages and accordingly provide a uniform rate of discharge and uniform discharge pressure for material processed in the material receiving passage.

Serious complications however, have developed in multi-stage rotary processors having material receiving passages in which a different geometry is required for passages receiving material from a passage(s) of another stage. For example, certain polymeric processes require a passage geometry which provides the passage with the capability to process and discharge material at a volume rate greater than the rate at which material is received by the passage. This variance or mismatch between the rate at which the passage receives material and the volume/rate capability of the passage to process and discharge material can cause large pressure, flow and temperature fluctuations in processing passages and particularly at the discharge of the rotary processor.

This invention is directed to multi-stage rotary processors having a novel, improved design which provides special advantages in terms of efficiency, quality of product and overall processing performance characteristics.

BRIEF SUMMARY OF THE INVENTION

The novel, multi-stage rotary processors of this invention comprise a rotatable element carrying a plurality of annular channels and a stationary element providing a coaxial closure surface operationally arranged with the channels to provide enclosed processing passages. The so-formed processing passages are designed to provide a plurality of interconnected processing stages which include a first processing stage and a second processing stage having inboard and outboard sections separated by a third processing stage. Each processing stage includes at least one passage having inlet means, outlet means and a channel blocking member associated with the stationary element and arranged and adapted so that material fed to the inlet can be carried forward by the rotatable channel walls to the blocking member for discharge from the passage.

Material transfer grooves are formed in the coaxial surface of the stationary element to provide means to transfer material between the processing stages. One material transfer groove is arranged and adapted to transfer material from the processing passages of the first processing stage to a processing passage of the inboard section of the second processing stage. Another material transfer groove is arranged to transfer material from a processing passage of the inboard section to a processing passage of the outboard section of the second processing stage. Finally, another material transfer groove is arranged and adapted to transfer material from a processing passage of the outboard section to a processing passage of the third processing stage. Material transferred to a processing passage of the third processing stage may be transferred to another processing passage of the third processing stage or discharged directly from the processor.

Details relating to the novel multi-passage rotary processor of this invention as well as the advantages derived from such processors will be more fully appreciated from the Detailed Description of the Preferred Embodiments taken in connection with the Drawings.

BRIEF DESCRIPTION OF THE DRAWINGS

The invention will be described in connection with the attached drawings in which:

FIG. 10 is tracing of graphical data recorded during operation of a rotary processor of FIG. 1.

DETAILED DESCRIPTION OF PREFERRED EMBODIMENTS

Figure 1:
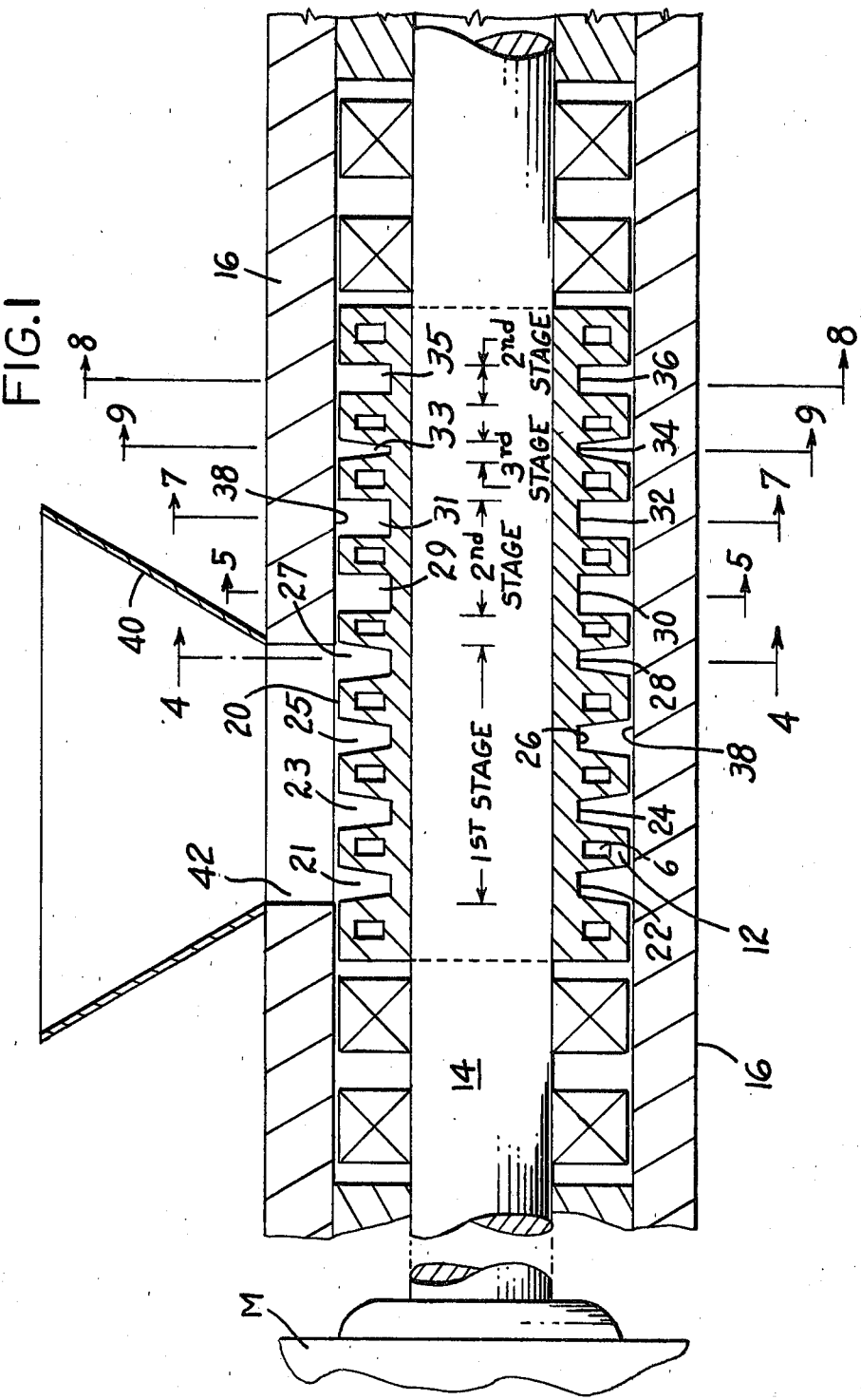
FIG. 1 is a cross-sectional view of a multi-stage rotary processor of this invention showing an arrangement of processing passages providing first, second and third processing stages.

Referring first to FIG. 1, novel, multi-stage rotary processors of this invention include a rotatable element comprising a rotor 12 mounted on a drive shaft 14 for rotation within a stationary element comprising a housing 16. Rotor 12 carries a plurality of processing channels 21, 23, 25, 27, 29, 31, 33 and 35 each having opposed side walls extending inwardly from rotor surface 20. Means for rotating rotor 12 are shown as M since such means are of any suitable type commonly used for rotating extruders or similar polymeric processing apparatus and are well known to those in the art. Housing 16 of the stationary element provides a coaxial closure surface 38 cooperatively arranged with surface 20 of rotor 12 to form with channels 21, 23, 25, 27, 29, 31, 33 and 35 enclosed processing passages 22, 24, 26, 28, 30, 32, 34 and 36 respectively.

As shown in FIG. 1, the processing passages are arranged and designed to provide a plurality of processing stages. Processing passages 22, 24, 26 and 28 provide the first stage. The second stage includes inboard and outboard sections with passages 30 and 32 providing the inboard section while passage 36 provides the outboard section. The third stage is provided by passage 34 and the third stage is positioned between and separates the inboard and outboard sections of the second stage. As will be explained in detail later, the stages are interconnected by material transfer grooves formed in surface 38 and arranged so that material processed in one stage can be transferred to another.

Multi-stage rotary processors of this invention can provide a variety of combinations of processing stage. Normally, the first stage involves a plasticating operation designed to melt, soften or otherwise increase the flowability of material fed to the processor. The second stage performs a compounding operation which can involve mixing, homogenizing or devolatilizing material processed in the first stage or adding ingredients to or removing ingredients from first-stage processed material. The third stage is normally assigned a pressurizing or pumping function to discharge second-stage processed material from the processor. For illustrative purposes, the multi-stage rotary processor described hereafter includes a first stage for melting—or at least partially melting—polymeric material, a second stage for mixing first-stage processed polymeric material and a third stage for discharging the first and second-stage processed material from the processor. A particularly suitable melt processing stage design for rotary processors of this invention is described and disclosed in commonly owned, copending application Ser. No. 336,936 filed concurrently herewith by Z. Tadmor and L. N. Valsamis.

Figure 2:
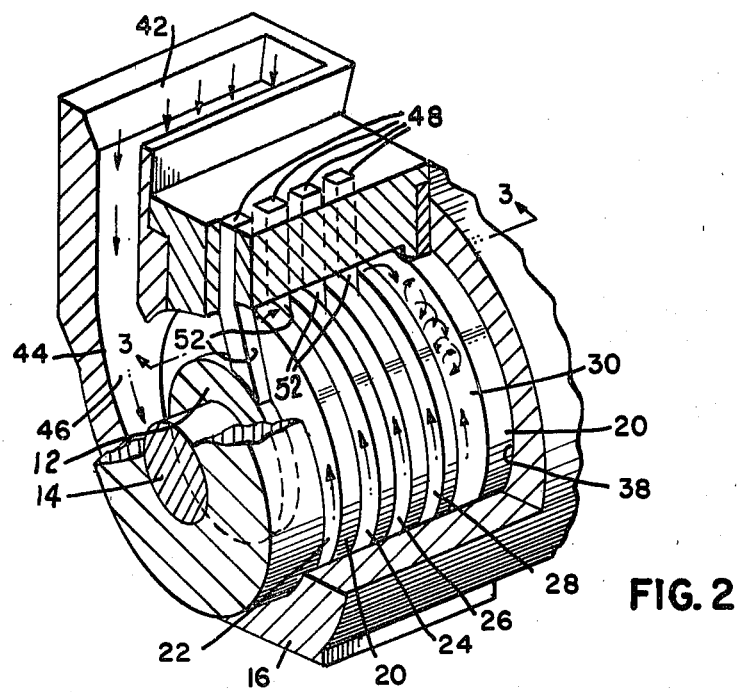
FIG. 2 is a perspective view of a rotary processor of the invention which is partly in section with parts broken away.
Figure 4:
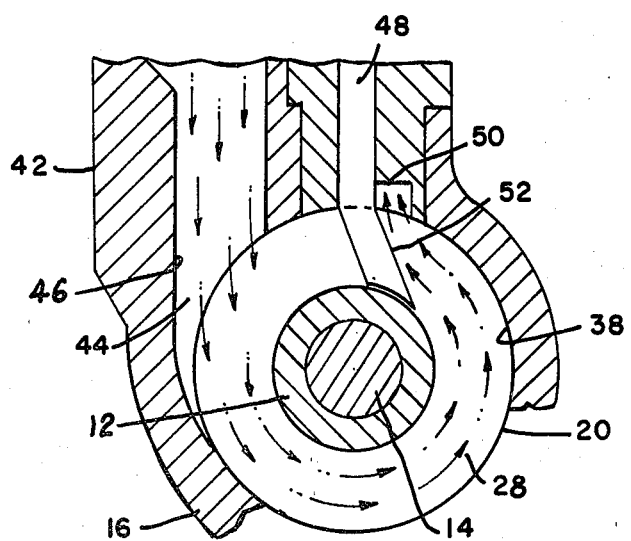
FIG. 4 is a simplified cross-sectional view of a first stage processing passage of the processor of FIG. 1 taken along line 4—4 of FIG. 1.

Referring now to FIGS. 2 and 4, material such as plasticated or unplasticated polymeric material is suitably fed to the multi-stage rotary processor from a hopper 40 communicating with inlet 42. As shown in FIGS. 2 and 4, coaxial surface 38 of housing 16 is cylindrical over most of its extent, but is preferably provided with undercuts 44 extending over the portions of channels 21, 23, 25, and 27 and adjacent inlet 42. Undercuts 44 have a width such that their sidewalls 46 extend out over cylindrical portions 20 of rotor 12 to form intake chambers designed to aid feeding of polymeric solids into each passage of the first stage.

In operation, material is supplied gravitationally or through the use of force feeders to the processor through inlet 42 and is urged by undercuts 44 into channels 21, 23, 25 and 27. The situation is shown in FIGS. 2 and 4. FIG. 2 illustrates a section of rotor 12 carrying channels 21, 23 25, and 27 of the first stage processing passages and channel 29 of the first passage of the inboard section of the second stage. FIG. 4 illustrates passage 28 of the first stage formed with channel 27 which has the same dimensions and arrangement of structural elements as the other first stage passages 22, 24 and 26. Each processing passage of the first stage includes a channel blocking member 48 arranged near first stage material transfer groove 50 which is arranged to communicate with each first stage passage. Transfer groove 50 is preferably spaced apart from inlet 42 a major portion of the circumferential distance about the processing passage.

As shown, (FIGS. 2 and 3), each blocking member 48 provides a material blocking and material collecting end wall surface 52 for each passage of the first stage. Accordingly, in operation, movement of the main body of material fed to each first stage passage is blocked and relative movement is established between the moving channel walls and the blocked material. The so-established relative movement generates frictional heat at the moving wall and within the body of material. Additionally, the channel walls of the first stage processing passages—and preferably all of the channel walls of the processor—are normally heated such as by a heat transfer fluid supplied in known manners to chambers 6 (FIG. 1). Details relating to suitable heating means can be found in referenced U.S. Pat. Nos. 4,142,805 and 4,194,841.

Normally, the action of the channel walls in dragging material forward builds up pressure progressively about the passage and maximum pressure in each of the first stage processing passages is usually reached at surface 52 of blocking member 48. Surface 52 of each first stage processing passage is shaped and dimensioned or otherwise adapted to collect the material for discharge from the passage.

Figure 3:
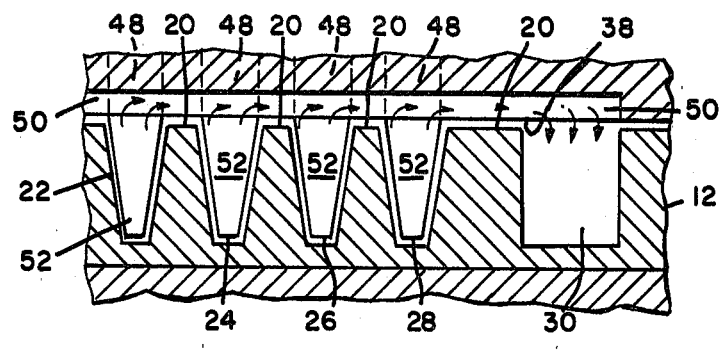
FIG. 3 is a simplified cross-sectional view of the rotary processor illustrated in FIG. 2 taken along line 3—3 of FIG. 2.

Material processed in the first stage is discharged from each passage through material transfer groove 50 (FIGS. 2 and 3). Transfer groove 50 is formed in coaxial surface 38 adjacent to and upstream of surface 52 of blocking member 48. Transfer groove 50 extends parallel to the axis of rotor 12 with the open end of groove 50 disposed to receive processed material collected at surface 52 of each passage and to convey the received material over surfaces 20 between the first stage passages for discharge to second stage processing passage 30. As shown in FIGS. 2 and 3, the most outboard terminal portion of groove 50 provides an inlet for passage 30.

The first stage illustrated in FIG. 1 has four processing passages of substantially identical shape and dimensions. More or less passages may be used and first stage passages differing in shape, dimensions and geometry from other first stage passages may also be used.

The second processing stage of multi-stage processors of this invention includes inboard and outboard sections separated by at least one processing passage of the third stage. As shown in FIG. 1, passages 30 and 32 provide the inboard section of the second stage while passage 36 provides the outboard section. As shown in FIGS. 2, 3 and 4, material from the processing passages of the first stage is discharged to the first passage 30 of the inboard section through transfer groove 50.

As mentioned, second stage processing passages are designed to perform compounding operations on first stage processed material. In the illustrated processor, the second stage is designed to efficiently mix melted or partially melted material supplied from the first stage. A processing passage assigned the function to provide efficient mixing of viscous material requires a different geometry from the geometry of the first stage polymer melting passages. As shown in FIG. 1 for example, the passages of the inboard section of the second stage have parallel sides and are wider than the passages of the first stage. This difference in geometry establishes a variance between the rate at which first stage processed material is supplied to the second stage passage and the capacity of the second stage passage. As mentioned, the variance presents the potential for severe fluctuations in temperature, flow and pressure in the processing passages and especially at the discharge region of the processor.

The effect of this variance can be best appreciated by illustrating the differences which can exist between the rate of supply of first-stage processed material and the processing and discharge capacity of a second-stage passage having a geometry selected to provide efficient mixing. As mentioned, an illustrative multi-stage rotary processor of this invention can include a first stage having four passages operating in parallel designed to provide for example a total first-stage processing volume of about 300 in$^3$. Such processors can be operated at a speed ranging between 50 to 150 RPM. Under such conditions, the rate of supply of melted material to the second-stage passage can range between 400 lbs/hr to 2500 lbs/hr depending on channel wall speeds and polymer properties. However, a relatively wide second-stage mixing passage is required for efficient mixing and a second-stage mixing passage selected for efficient mixing can provide a geometry capable of processing and discharging material at a rate between 7500 lbs/hr to 22,500 lbs/hr at speeds between 50 to 150 RPM. Rotary processors of this invention are designed to permit the effective use of passages presenting this variance between supply and processing or discharge rates. Additional details relating to the variance discussed above can be found in commonly assigned, copending U.S. Ser. No. 336,929 filed on the same day as this application by L. N. Valsamis and G. Donoian.

Figure 5:
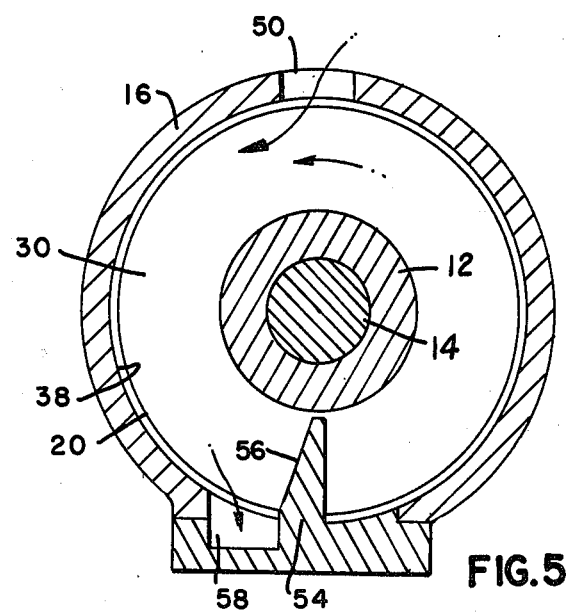
FIG. 5 is a simplified cross-sectional view of a second stage processing passage of the processor of FIG. 1 taken along line 5—5 of FIG. 1.
Figure 7:
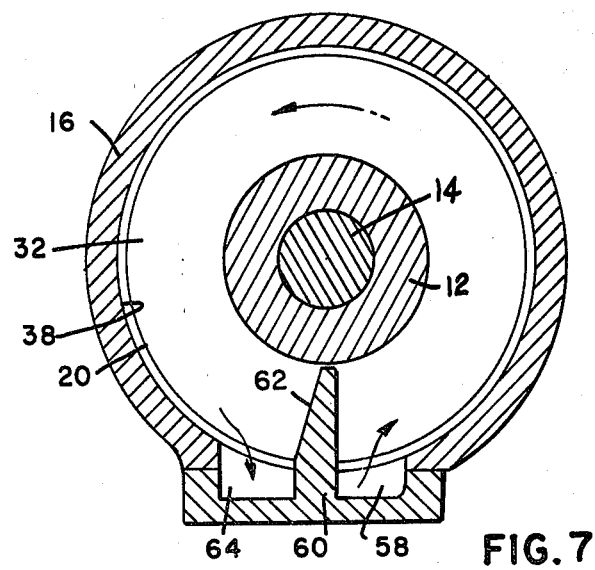
FIG. 7 is a simplified cross-sectional view of another second stage processing passage of the processor of FIG. 1 taken along line 7—7 of FIG. 1.

Referring again to FIGS. 1, 2 and 3, material processed in the first stage is transferred by way of groove 50 to the first passage 30 of the inboard section of the second stage. In rotary processors of the invention, first-stage processed material is efficiently mixed in passage 30 by the relative movement established between material blocked by blocking member 54 (FIG. 5) and the moving channel walls of passage 30 which drag or carry the material forward to material collecting and material blocking end wall surface 56. In the multi-stage processors of this invention, the blocking members of the processing passages of the inboard section (members 54 and 60—FIGS. 5 and 7) are arranged about 180° from the circumferential position of first-stage passage blocking members 48. Accordingly, in the first passage 30 of the inboard section, material travels approximately one-half a revolution through the passage before reaching blocking member 54. Material blocked and collected at surface 56 of member 54 is discharged from passage 30 through inboard section material transfer groove 58.

Figure 6:
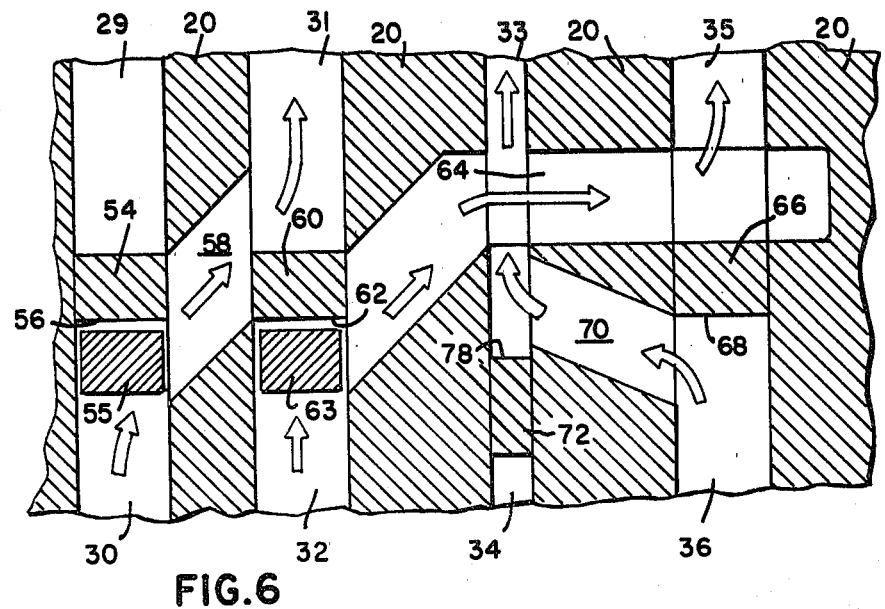
FIG. 6 is a simplified schematic view of the interconnection of processing passages of rotary processors of the invention by means of a material transfer groove with arrows indicating flow direction of material from one processing passage to another.

Transfer groove 58 is shown in FIG. 6 which is an idealized and simplified presentation with arrows indicating flow direction in material transfer grooves relative to blocking members arranged in passages of the inboard and outboard sections of the second stage and to a blocking member arranged in a third-stage passage. As shown, transfer groove 58 is formed in coaxial surface 38 and is designed, arranged and adapted to receive material collected at surface 56 and transfer the collected material over surface 20 between passage 30 and 32 of the inboard stage. Essentially, the open end of transfer groove 58 may as shown extend parallel to the axis of rotor 12 in the region of passage 30 upstream of surface 56 then extend transversally to the axis of rotor 12 across surface 20 and then extend parallel to the axis of rotor 12 in the region of passage 32 downstream of blocking member 60. When so arranged, transfer groove 58 provides an outlet for discharging material from first passage 30 of the inboard stage and an inlet for supplying material to second passage 32 of the inboard section.

In multi-stage rotary processors of this invention, a pin 55 can be arranged as shown in channel 29 upstream of surface 56 of passage 30. Pin 55 is associated with housing 16 and is designed and adapted for adjustable extension into channel 29 from a fully open to a fully closed position. In the fully open position, no portion of pin 55 extends into channel 29. In the fully closed position, pin 55 extends radially into channel 29 to block any substantial movement of material into the transversally extending portion of transfer groove 58. Pin 55 provides an effective means for selectively adjusting and controlling the rate of transfer of material through groove 58 to provide the desired degree of processing in the passage and/or the desired rate of material transfer from passage to passage. As described in referenced U.S. Pat. No. 4,227,816, transfer groove 58 can be formed in removable flow director units which can be mounted in slots in housing 16 arranged to permit cooperation of the transfer groove with selected passages. Pin 55 and blocking members 54 and 60 can also be carried by the removable flow director unit.

Material transferred to the second passage 32 of the inboard section is further mixed by the relative movement established between material blocked by blocking member 60 (FIG. 7) and moving channel walls of passage 32. The moving walls drag or carry material forward to blocking member 60 for collection at surface 62 and discharge through inboard section material transfer groove 64.

The inboard section of the second stage illustrated and described includes two passages having substantially the same dimensions, shape and geometry. This preferred illustrated arrangement of inboard section mixing passages can be varied. For example, the inboard section can involve only one or more than two passages and the shape, dimensions and geometry of the passages can be the same or different. As illustrated, preferred second-stage inboard section passages are those in which the passage or passages receiving first-stage processed material has a geometry providing a processing and discharge capacity which is greater than the rate at which material is supplied to the passage. However, for certain second-stage processing operations the selected geometry of the fist-stage material receiving passage can provide a capacity which is equal to or less than the supply rate of material.

Referring again to FIG. 6, transfer groove 64 is formed in coaxial surface 38 and has an open end which extends parallel to the axis of rotor 12 from the region of passage 32 upstream of surface 62 then transversally to the axis of rotor 12 across surface 20 between passages 32 and 34 and then parallel to the axis of rotor 12 across channel 33 of passage 34 and across surface 20 between passages 34 and 36 to the region of passage 36 downstream of blocking member 66. Accordingly, material from the inboard section of the second stage is transferred to the outboard section across channel 33 of third-stage processing passage 34 separating the inboard and outboard sections. In operation, third stage passage 34 is designed to be sufficiently filled and to generate high pressures so that leakage of material from transfer groove 64 to channel 33 is minimal. As shown, adjustable pin 63 can be arranged in channel 31 to provide means to selectively adjust and control the rate of supply of material to groove 64 in the same manner as described before for pin 55.

Figure 8:
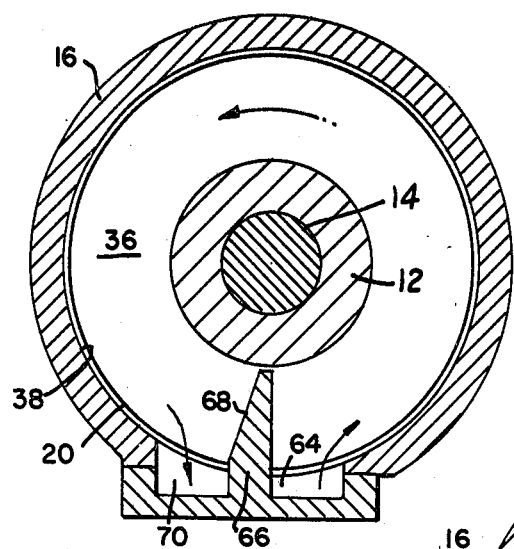
FIG. 8 is a simplified cross-sectional view of still another second-stage processing passage of the processor of FIG. 1 taken along line 8—8 of FIG. 1.

As shown in FIG. 8, material is supplied to the second stage section, passage 36, through transfer groove 64. The supplied material is dragged forward by the channel walls of passage 36 to blocking member 66 for collection at surface 68 for discharge through outboard section material transfer groove 70.

The second-stage outboard section shown in FIGS. 1 and 8 consists of one passage, but rotary processors of this invention can include those in which more than one passage can be involved. As illustrated in FIG. 1, the processing passage of the second-stage outboard section differs somewhat in dimensions from the processing passages of the second-stage inboard section. In the illustrated processor, the passage channel 35 is narrower and the geometry has been selected to develop sufficient pressure to supply material to passage 34. However, the number, shape, dimensions and geometry of the passage(s) of the outboard section can be the same or different relative to each other or relative to the inboard section passages.

Referring again to FIG. 6, material processed in the second-stage outboard section is transferred to a processing passage of the third stage through material transfer groove 70. Transfer groove 70 is formed in coaxial surface 38 and has an open end which extends parallel to the axis of rotor 12 across the region of passage 36 upstream of surface 68, then extends transversally to the axis of the rotor and then extends parallel to the axis of the rotor in the region of passage 34 downstream of blocking member 72. Third-stage passage 34 (FIGS. 1 and 9) is primarily designed to function as a pressurizing or pumping stage for material supplied from the outboard section of the second stage. Accordingly, the geometry of the passage is selected to provide a passage having a capacity which remains at least partially filled at all times during operation and which is capable of generating high discharge pressures.

Figure 9:
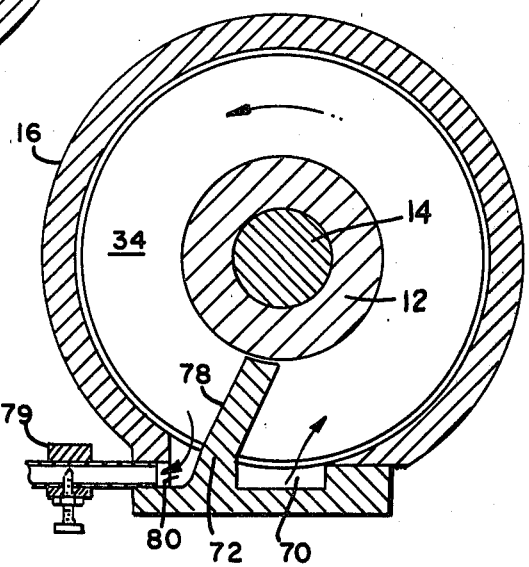
FIG. 9 is a simplified cross-sectional view of a third-stage processing passage of the processor of FIG. 1 taken along line 9—9 of FIG. 1.

As shown in FIG. 9, material supplied to the third-stage processing passage is dragged forward by the channel walls of passage 34 to blocking member 72. Material collected at surface 78 is discharged from the processor through outlet 80. Discharge pressure and the pressure developed in passage 34 can be controlled or adjusted by discharge control means 79 (FIG. 9) such as a throttling valve or like device arranged in communication with discharge outlet 80.

FIGS. 1 and 9 show a third-stage processing section consisting of one passage, but more than one passage may be used. The passages may be connected in parallel or in series. For example, a plurality of third-stage processing passages may be interconnected so that material can be transferred from one third-stage processing passage to another for discharge from the processor. Alternatively, a plurality of third-stage processing passages can be interconnected so that material is fed to each passage and discharged from the processor from each passage.

Multi-stage processors of this invention present highly efficient polymeric processors providing special operational and design advantages. A multi-stage processor as described and illustrated presents such advantages as compact size, low power consumption and high production potential for efficiently melting, mixing and discharging a polymer melt product of uniformly high quality at substantially constant rate and at uniform pressure and temperature. For example, a multi-stage rotary processor of the type described with reference to FIGS. 1-9, has been employed to process a variety of polymeric materials. The processor included a rotor having an O.D. of 14 in. which carried an arrangement of processing passages as shown in FIG. 1 interconnected by material transfer grooves. The material transfer grooves were formed in the coaxial surface of the stationary housing in substantially the same arrangements shown in FIGS. 2 and 4 and in FIG. 6.

The first-stage passages of the processor included four wedge-shaped channels as shown in FIGS. 1, 2, and 4. Each channel had a maximum width of 1.0, a minimum width of 0.65 in. and a height of 2.45 in. The second-stage inboard section passage included two channels having parallel sides with each having a width of 1.0 and a height of 2.45 in. The second-stage outboard section passage of the processor included one wedge shaped channel having a maximum width of 0.5 in., a minimum width of a 0.325 in. and a height of 2.45 in. The third-stage processing passage included one wedge shaped channel having a maximum width of 0.25 in., a minimum width of 0.162 in. and a height of 2.45 in.

In a typical processing operation, high density polyethylene was fed to the first stage of the heated processor at a rate of 630 lbs/hr. The processor rotor was rotated at a speed of 50 rpm. A valve arranged with the third-stage passage outlet was adjusted to provide a discharge pressure of 750 p.s.i. During about the first five minutes of operation, severe fluctuations in the discharge pressure were noted. Pressures varying from about 50 psi to about 1,000 psi were recorded during the period. After about five minutes of operation, however, the discharge pressure reached a substantially steady state and stabilized at about 750 psi. The processor was operated for about five minutes at the stabilized pressure of about 750 psi. The valve was then adjusted to provide a discharge pressure of about 1800 psi. In about four to five minutes, the discharge pressure built up from 750 psi to about 1800 psi and operation was continued for about five minutes at a substantially constant discharge pressure of 1800 psi. During this period, the temperature of discharged melt material stabilized at about 320° F. The valve was again adjusted to provide a discharge pressure of about 2,100 psi. Within about two minutes, the discharge pressure stabilized at about 2,150 psi and remained substantially constant throughout operation.

FIG. 10 dramatically illustrates the achievement of the substantially constant discharge pressure in the multi-stage rotary processor described above. FIG. 10 is a tracing of actual data plotted by a strip chart recorder for discharge pressure and outboard passage pressure recorded during operation of the processor. The portion of the upper recording line to the right of the vertical line involves the period of operation during which the discharge pressure is built up from 1800 psi to about 2,150 psi. The portion of the recording line to the left of the upper vertical line illustrates the substantially constant discharge pressure achieved. As shown by the lower recording line, pressure fluctuations are continually recorded for the pressures developed in the outboard passage. These fluctuations may be caused by leakage of material from the high pressure discharge passage to the outboard passage. Despite these fluctuations, however, material is continually discharged throughout operation at a substantially constant discharge rate of 630 lbs/hr, at a substantially constant discharge pressure of 2,150 psi and at a substantially constant temperature of 320° F. The discharge melt product was of excellent uniform quality, extremely "clean" and essentially free of bubbles.

In addition to providing an especially effective capability for processing material at a constant discharge rate and uniform temperature and pressure, the design of multi-stage rotary processors of this invention provides special advantages in minimizing external leakage from the processor. Normally, seals of the type described in U.S. Pat. No. 4,300,842 are employed to control external leakage. Such seals are arranged on surface 20 near each end of rotor 12 to control leakage of material from the processor through the clearance between rotor end surfaces 20 and surface 38. Preferred multi-stage processors of this invention include such sealing means to control external leakage. Additionally, such sealing means can be arranged on surfaces 20 between processing passages to control internal leakage from one passage to another through the clearance between surfaces 20 and 38. The preferred processors of this invention also include such internal leakage control seals. Accordingly, in the illustrated processor such seals would be arranged on surfaces 20 between passages 30 and 32 of the inboard section and between passage 32 and third-stage passage 34 and on surface 20 between passage 34 and outboard section passage 36.

The design of multi-stage rotary processors of this invention, however, inherently reduces the potential for external leakage and provides an especially effective degree of control for external leakage. As described and shown, the third-stage passage is designed to pressurize and pump processed material for discharge from the processor. Pressures in the range of about 1,000 psi to about 4,000 psi can be developed about the circumference of such pumping passages thereby increasing the potential for leakage through the clearance provided by surfaces 20 and 38. However, in processors of this invention, the high pressure pumping passage is arranged between inboard and outboard section passages which are designed to operate at relatively low pressures. In operations involving the illustrative processor described before, pressures between about 150 psi to about 300 psi are usually developed about the circumference of the inboard section passage while pressures between about 150 psi to about 300 psi are developed in the outboard section passage. The relative positioning of the outboard section passage and the pressurizing or pumping passage dramatically reduces the potential for external leakage from the processor at the outboard end.

There are still other special advantages provided by the shown and described arrangement of the high-pressure processing passage between inboard and outboard section processing passages operating at relatively lower pressures. Material which leaks from the high-pressure processing passage to the inboard and outboard section passages can be collected in these inboard and outboard passages and recycled to the third stage passage for discharge. Also, the material transfer groove 64 connecting the inboard and outboard passage sections separated by the high-pressure passage has an open end which passes over surfaces 20 between the high-pressure passage and the inboard and outboard section passages. The clearance between surfaces 20 and 38 defines a region in which extremely high shear forces and temperatures can be generated. Leakage material from the high-pressure passage can be carried about the circumference of the passage by moving surfaces 20 and undergo degradation because of the encountered conditions of high shear and temperature. In the multi-stage rotary processors of this invention, however, the material transfer groove is arranged and adapted for collection of leakage material carried by moving surface 20. Accordingly, any such leakage material can be continually removed from surface 20 during each revolution of the rotor thereby controlling the residence time that leakage material on surface 20 is subjected to degradative conditions.

Figure 11:
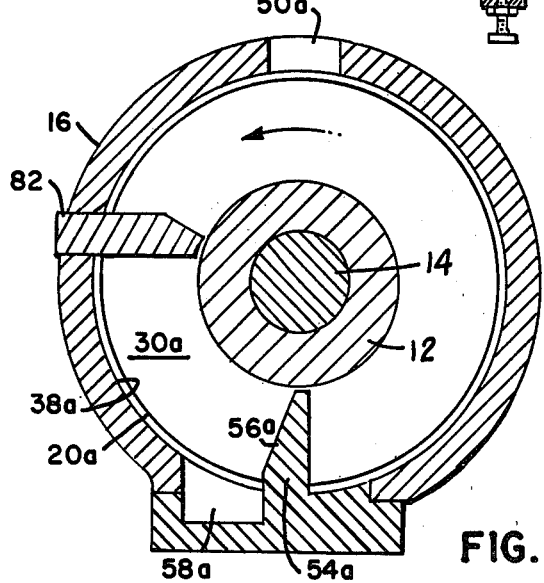
FIGS. 11 and 12 are simplified cross-sectional views of second-stage processing passages substantially identical to the passages of FIGS. 5 and 7 respectively, but having additional processing elements arranged in the passages.

As mentioned, the inboard and outboard sections of the second stage are adapted to perform compounding operations. The compounding operations can include melting, mixing, homogenization and devolatilization of materials among others as well as the addition of materials to or withdrawal of materials from the processed materials. FIGS. 11-14 illustrate the adaptability and versatility of second-stage processing passages in conducting various processing operations. FIG. 11 illustrates a first-stage material-receiving processing passage of the inboard section similar to the inboard section passage shown in FIG. 5. As shown in FIG. 11, one (or more) mixing element(s) 82 is positioned between material transfer grooves 50a and 58a. Mixing element 82 extends into the channel of passage 30a a preselected distance to obstruct a portion of the cross section of passage 30a to mix material processed in the passage and/or to minimize temperature fluctuations in material processed about the circumference of the passage. The shape, design and dimensions of mixing element(s) 82 can vary depending upon the degree and type of mixing desired. Mixing elements include those which can scrape off material carried by the channel walls to recirculate scraped off material with material blocked by channel blocking member 54a. Material processed in a second-stage passage of FIG. 11 is collected at end wall surface 56a for discharge through material transfer groove 58a to another second-stage passage or to a third-stage passage.

Figure 12:
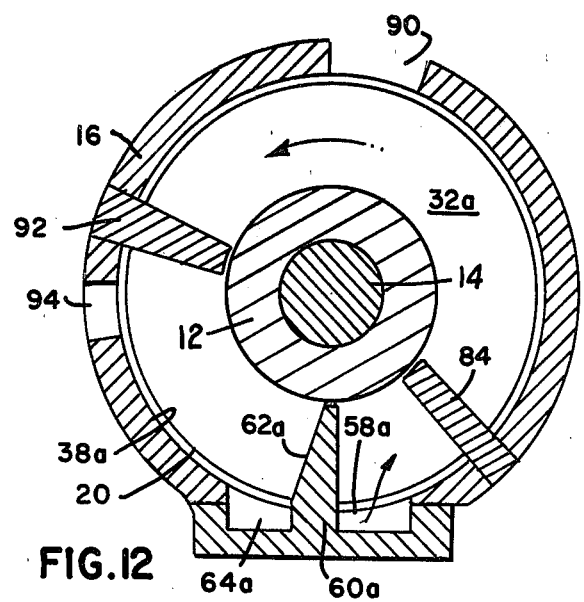
Figure 13:
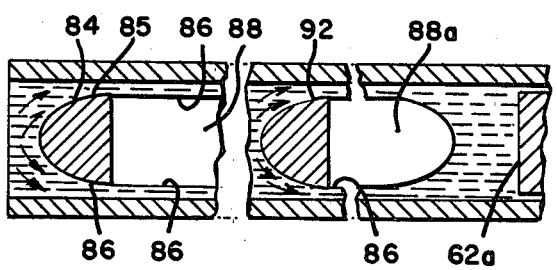
FIG. 13 is a top cross-sectional view of the passage of FIG. 12 showing processing of material moving through the passage.

FIGS. 12 and 13 illustrate another arrangement of elements designed to achieve a selected compounding operation in one or more of the second-stage processing passages. FIG. 12 illustrates an inboard processing passage similar to the inboard section passage shown in FIG. 7. As shown, spreader element 84 is arranged near transfer groove 58a of an inboard section second-stage processing passage similar to that shown in FIG. 7. Spreader element 84 is of substantially the same cross-sectional shape and dimensions of channel 31a of passage 32a and positioned near transfer groove 58a and arranged and adapted to spread material fed to the passage so that the moving walls of the channel of passage 32a drag the material through the clearances provided by sides 85 (FIG. 13) of spreader element 84 so that the spread material is carried forward as thin layers 86 (FIG. 13) by the channel walls.

As best shown in FIG. 13, a free central space is provided in portions of the passage downstream of spreader member 84 and the thin layers 86 have surfaces exposed to free central space 88. Accordingly, volatiles in layers 86 may pass into free central space 88 and be withdrawn through a port 90 with the aid of vacuum if desired. Alternatively, port 90 may be used to introduce materials to layers 86. As shown, the passage may include more than one spreader element. Spreader element 92 respreads and regenerates thin layers on the moving channel walls to provide a second central free space 88a downstream of spreader member 92. Another port 94 communicating with the second free space may be used to add ingredients to or withdraw ingredients from the thin layers in the manner described above. Material processed in a passage illustrated by FIGS. 12 and 13 is collected at end wall surface 62a of blocking member 60a for discharge through outlet 64a to another second-stage processing passage or to a third-stage processing passage.

Figure 14:
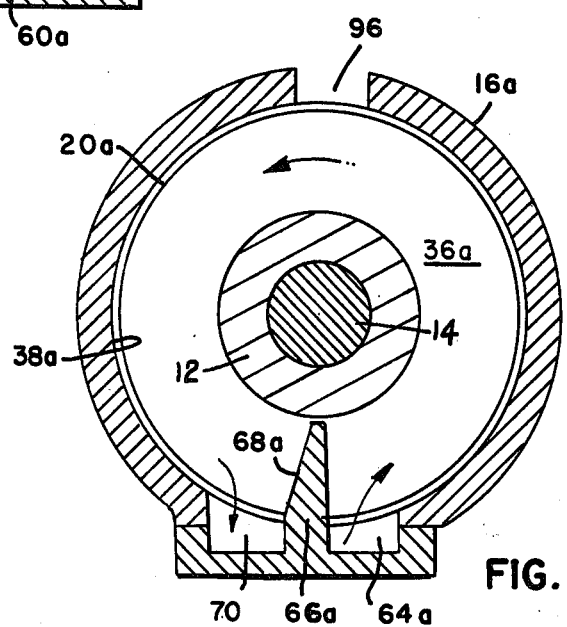
FIG. 14 is a simplified cross-sectional view of a second-stage processing passage substantially identical to the processing passage of FIG. 8, but having additional processing elements arranged in the passage.

FIG. 14 illustrates still another of the arrangements of structural elements involved in second-stage processing passages of multi-stage processing passages of this invention. FIG. 14 illustrates an outboard processing passage similar to the outboard passage shown in FIG. 8. A port 96 is shown positioned in passage 36a. Ingredients may be added to or withdrawn from material processed in the passage of FIG. 14 and the port (or ports) can be arranged at any desired position about the circumference of passage 36a between transfer grooves 64a and 70a. Material processed in the passage of FIG. 14 is collected at end wall surface 68a of blocking member 66a for discharge to another outboard passage or to a third-stage passage. The arrangement of elements in the illustrated passage is particularly suitable for withdrawing ingredients preferably under vacuum, from material processed in passage 36a prior to discharge from the passage.

From the above description, it should be apparent that the novel, multi-stage rotary processors of this invention present many distinctive and unexpected advantages. The processors provide especially desirable polymer processing performance characteristics. The distinctive design of the second-stage inboard section and the second-stage outboard section separated by a third stage permits effective utilization of second-stage passages which can present a variance between supply rate of first-stage processed material and the processing and discharge capacity of second-stage processed passages. However, the design of rotary processors of this invention effectively controls potential fluctuations or surges in discharge rate, temperature and pressure which can occur in processing passages because of the variance. Moreover, the arrangement of the third stage relative to the inboard and outboard sections of the second stage minimizes any potential of external leakage from the relatively high-pressure pumping or pressurizing stage. Additionally, the arrangement is designed to collect and recycle leakage material from high-pressure passages and to minimize degredation of such leakage material. Accordingly, the invention presents to the art novel, multi-stage rotary processors having unexpectedly improved overall processing performance characteristics as compared to rotary processors known to the art at the time this invention was made.

We claim:

1. A rotary processor comprising a rotatable element carrying a plurality of processing channels and a stationary element having a coaxial closure surface operationally arranged with said channels to provide enclosed processing passages and where the processing passages provide a plurality of interconnected processing stages including a first processing stage and a second processing stage having inboard and outboard sections separated by a third processing stage, said first processing stage having at least one passage comprising an inlet, a first-stage material transfer groove and a blocking member associated with the stationary element and arranged so that material fed to the passage can be blocked and supplied to the transfer groove for transfer to the inboard section of the second processing stage which includes at least one passage adapted to receive material from the first-stage material transfer groove and comprising a blocking member and an inboard section material transfer groove associated with the stationary element and arranged so that material fed to the passage can be blocked and supplied to the inboard section material transfer groove for transfer of material to the outboard section of the second processing stage over an open channel of a third-stage processing passage and where the outboard section includes at least one passage adapted to receive material from the inboard section transfer groove and comprising a blocking member and an outboard section material transfer groove associated with the stationary element and arranged so that material fed to the passage can be blocked and supplied to the outboard section transfer groove for transfer to the third processing stage which includes at least one passage capable of developing discharge pressure and adapted to receive material from the outboard section material transfer groove and comprising a blocking member and an outlet associated with the stationary element and arranged so that material can be blocked and discharged from the passage through the outlet and, means to control discharge of material from the outlet.

2. A processor of claim 1 where the first-stage material transfer groove is spaced apart from the inlet of the first-stage processing passage(s) a major portion about the circumference of the first-stage processing passages(s).

3. A processor of claim 1 including means to heat at least the passage(s) of the first processing stage.

4. A processor of claim 1 where the passage(s) of the first processing stage is formed with a wedge-shaped channel(s).

5. A processor of claim 1 where the passage of the inboard section of the second stage has a selected geometry providing a capacity for the passage to process and discharge first-stage processed material at a volume rate greater than the volume rate of material supplied to the inboard section passage.

6. A processor of claim 1 where the blocking member(s) of the passage(s) of the inboard section is disposed about 180° from the circumferential position of the blocking member(s) of the passage(s) of the first processing stage.

7. A processor of claim 6 where the inboard section includes more than one passage and the inboard section passages are arranged and adapted for series operation.

8. A processor of claim 1 where the passage of the outboard section has a selected geometry which provides the development of pressure in the passage greater than the pressure developed in the inboard processing passage.

9. A processor of claim 1 where the first stage includes four passages arranged and adapted for parallel operation and formed with wedge-shaped channels, the inboard section includes two passages arranged and adapted for series operation and having members disposed about 180° from the circumferential position of the blocking members of the passages of the first stage, the outboard section includes one passage having a geometry selected to develop pressures greater than developed in an inboard section passage and the third stage includes one passage capable of developing discharge pressure.

10. A processor of claim 1 where at least one inboard section passage and/or at least one outboard section passage includes a mixing element positioned about the circumference of the passage and extending into the channel to mix material processed in the passage.

11. A processor of claim 1 where at least one inboard section passage and/or at least one outboard section passage includes a spreader element positioned about the circumference of the passage and extending into the channel to spread material fed to the passage on the channel walls to provide a free space downstream of the spreader element and a port arranged and adapted to communicate with the so-formed free space so that ingredients may be added to or be withdrawn from material processed in the passage.

12. A processor of claim 1 where at least one inboard section passage and/or at least one outboard section passage has a port positioned about the circumference of the passage arranged and adapted to add ingredients to or to withdraw ingredients from material processed in the passage.

13. A processor of claim 1 where an adjustable pin is arranged with the inboard section material transfer groove to adjust the rate at which material is transferred through the groove from one inboard section passage to another inboard section passage.

14. A processor of claim 1 where an adjustable pin is arranged with the inboard section material transfer groove to adjust the rate at which material is transferred from one inboard section passage to an outboard section passage.

* * * * *